United States Patent Office 3,465,814
Patented Sept. 9, 1969

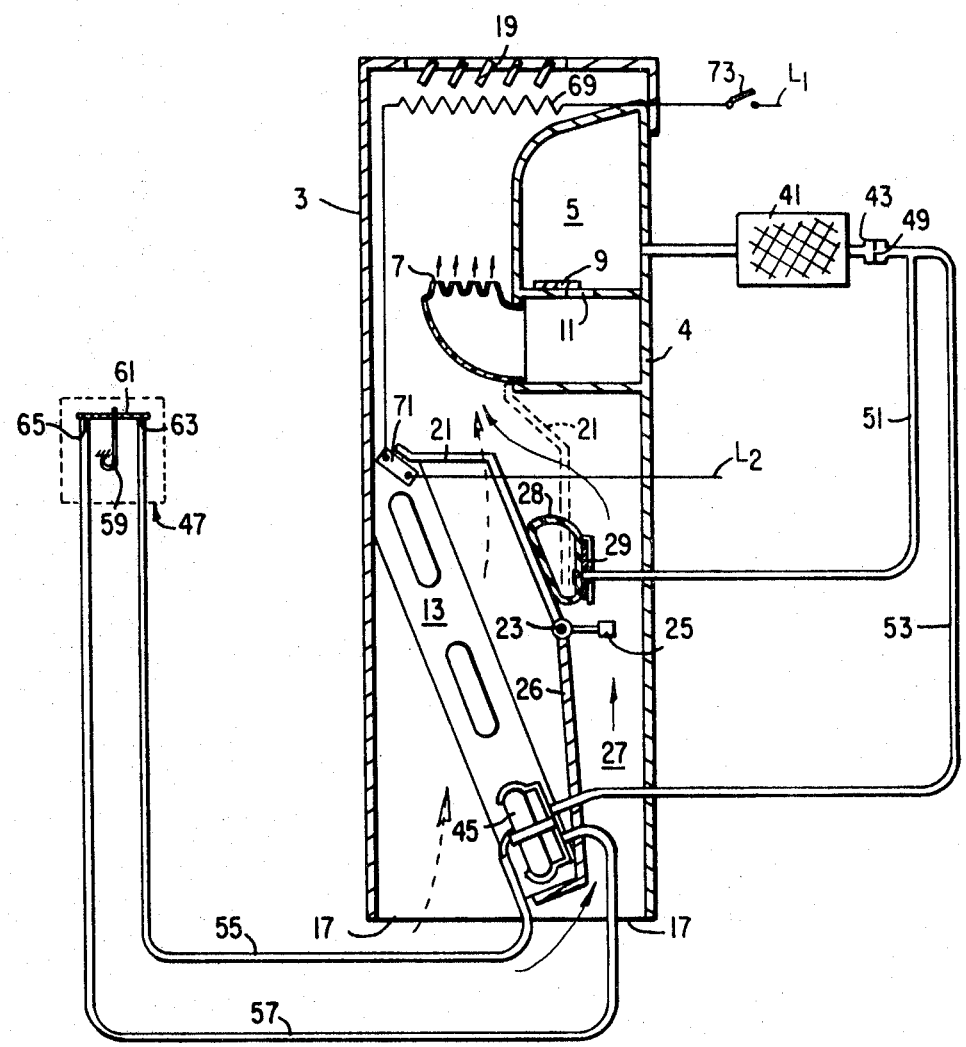

3,465,814
AIR CONDITIONING TERMINAL
William C. Heck, De Witt, and Daniel A. Fragnito, Solvay, N.Y., assignors to Carrier Corporation, Syracuse, N.Y., a corporation of Delaware
Filed Mar. 12, 1968, Ser. No. 712,420
Int. Cl. F25b *13/00, 29/00;* F24f *3/00*
U.S. Cl. 165—2                                 5 Claims

ABSTRACT OF THE DISCLOSURE

A room terminal having self-contained controls adapted to receive chilled or heated water for heating or cooling an area to be conditioned provided with an electric resistance heating element indirectly responsive to the controls to provide heat to the conditioned area, if necessary, only when the room terminal is supplied with chilled water.

BACKGROUND OF THE INVENTION

Various induction type room terminals are available to heat or cool an area or room to be conditioned. These terminals employ conditioned air from a central source, normally referred to as primary air, to induce room air over a coil supplied with chilled or heated water for cooling or heating the room air. A thermal valve in the water line responsive to room temperature is utilized to control the flow of water through the coil.

Frequently, conditions arise during the cooling season when heating is required to maintain desired conditions in a room or zone to which the air conditioning system is applied. To provide heating under these conditions, operation of the water chilling equipment may be discontinued and heating equipment placed in operation to provide hot water to the terminal, or in certain circumstances, the unit may have two coils, hot water being supplied to one of the coils and cold water being supplied to the other coil so that either heating or cooling is available in the area being treated at all times. Another arrangement for providing heat in the area being treated, even though chilled water is available at the terminal coil, is to provide electrical resistance elements in the unit.

The three arrangements described above all have certain disadvantages. A considerable amount of time may be involved in discontinuing operation of the water chilling equipment and placing the water heating equipment in operation or to change from heating to cooling. Further, when the heating equipment is in operation to the exclusion of the water chilling equipment, all the room terminals on the circuit are provided with hot water, even though cooling may be required from some of the terminals. To provide two separate coils for every unit and operate two pumping systems is expensive as is the piping to the terminals. An electrical resistance heating element requires additional controls which increases the costs of installation.

SUMMARY OF THE INVENTION

This invention relates to an induction type room terminal having a bypass damper therein to bypass induced air flowing through the terminal around the terminal heat exchanger coil to maintain the desired room temperature as sensed by a bleed type thermostat. An electrical resistance heating element, energized by closure of the damper, is provided to supply heat to the room when the heat exchange coil is supplied with chilled water.

BRIEF DESCRIPTION OF THE DRAWING

The figure is a sectional view of an induction type room terminal embodying the present invention.

DESCRIPTION OF THE PREFERRED EMBODIMENT

Referring to the drawing, there is illustrated a room terminal including a casing 3 in which is disposed a base unit 4 having a primary air plenum 5 adapted for communication with a source of conditioned air (not shown). Plenum chamber 5 is provided with suitable discharge means, such as nozzles 7 to discharge primary air within the terminal. The flow of air from plenum 5 to nozzles 7 may be regulated by a balancing damper 9 which is movable to restrict flow of air through slot 11.

The base unit 4 is provided with a heat exchanger 13 adapted for connection to a suitable source (not shown) of conditioning medium such as chilled or heated water for flow therethrough. Heat exchanger 13 is located within casing 3 for flow of induced room air therethrough.

The room terminal casing 3 has an opening or inlet 17 at the bottom thereof to permit room air to be induced into the unit by the primary air discharged from nozzles 7. A grille 19 in the top of casing 3 is provided for passage of the mixture of induced air and primary air into the area being conditioned.

Passage of room air through heat exchanger 13 is regulated by means of a bellows-damper arrangement. A damper 21, substantially coextensive with the length of the heat exchanger 13, is mounted on shaft 23 which is journalled in the sides (not shown) of base unit 4. The damper is urged by a counterbalance 25 in a clockwise direction to allow passage of induced air through heat exchanger 13. A partition 26 in the room terminal cooperates with damper 21 to create a passageway 27 for passage of induced air around heat exchanger 13. Depending on the position of damper 21, induced air may be passed through heat exchanger 13 or through passage 27.

An expansible balloon or bellows 28 is provided to move damper 21 in a counterclockwise direction in opposition to counterbalance 25. The bellows may be made of any suitable elastomeric material. The bellows is secured to a support bracket 29 which is affixed to casing 3.

The inflation of the bellows and therefore the disposition of the damper 21 is regulated by a control air system comprised of a filter 41, restrictor 43, changeover valve 45 and a dual bleed thermostat 47. A small quantity of conditioned air from plenum 5 is passed through air filter 41 to eliminate dust particles that may have escaped the central air filtration system. The filtered air is then passed through restrictor 43 which contains an orifice 49. A line 51 communicates bellows 28 with the downstream side of restrictor 43.

The changeover valve 45 also communicates with the downstream side of restrictor 43 through line 53. The changeover valve senses the temperature of the conditioning medium flowing through heat exchanger 13 and diverts the air from line 53 through line 55 or line 57 to the heating or cooling portion of the thermostat 47. For a detailed description of a suitable changeover valve, reference may be had to U.S. Patent No. 3,165,263, granted on Jan. 12, 1965, to R. C. Dreibelbis.

Thermostat 47 includes a bimetal actuator 59 responsive to room temperature for selectively positioning a sliding plate 61 over heating bleed port 63 which communicates with line 55 or over cooling bleed port 65 which communicates with line 57.

To provide room heating, even though the heat exchange coil 13 is supplied with chilled water, electric resistance heating element 69 is provided within the terminal for passage of a mixture of primary and induced air thereover. The heating element is energized by switch 71 which is closed by damper 21 when the damper has moved to a position substantially preventing passage of induced air through coil 13, as illustrated by the solid line position in the figure. Electrical energy is supplied to the heating element 69 through lines $L_1$ and $L_2$. A manual switch 73 in line $L_1$ is provided to deactivate the electric heating circuit when hot water is supplied to the heat exchanger. The manual switch could be arranged so as to cut off power to the heater if the air flow through the terminal was discontinued to prevent overheating of the terminal.

Considering the operation of the room terminal when chilled water is supplied to the heat exchanger, changeover valve 45 will provide communication between lines 53 and 57 to bleed control air through cooling port 65. If the room temperature as sensed by bimetal actuator 59 is warmer than the thermostat setting, the bimetal actuator will move plate 61 to uncover bleed port 65 to bleed air therefrom and decrease control air pressure in the control air lines downstream of restrictor 43. Less pressure accordingly is imposed upon bellows 28 causing bellows 28 to deflate and move damper 21 toward an open position so that room air induced into the terminal passes through heat exchanger 13 in heat exchange relation with medium passing through the coil and is cooled.

As the room temperature approaches the desired level, the bimetal actuator will move plate 61 to partially cover port 65, increasing control air pressure and moving damper 21 toward a closed position to allow a portion of the induced air flowing through the terminal to bypass heat exchanger 13. Ordinarily, a condition is reached where the damper is modulated between open and closed positions and room temperature is stabilized at the desired level.

If, for any reason, the room becomes too cool, the bleed port will be completely blocked and control pressure will increase sufficiently to move damper 21 to a closed position thereby activating switch 71 to provide electric resistance heating of the air flowing through the terminal. When the temperature of the area being conditioned reaches the desired predetermined level, port 65 will be partially uncovered, allowing control air to bleed therefrom and reduce control air pressure to open the damper and open switch 71 to de-energize resistance heater 69.

For normal heating operation, hot water is supplied to heat exchanger 13; changeover valve 45 responding to the temperature of hot water passing through exchanger 13 places lines 53 and 55 in communication to provide control air to heating bleed port 63. The quantities of air bled from port 63 will control the position of damper 21, as explained above, to regulate the amount of air passing through heat exchanger 13. When hot water is supplied to heat exchanger 13, switch 73 may be manually opened as the resistance heat is not required.

While we have described a room terminal, which is adapted to receive both a heating and a cooling medium, it is to be understood that in areas where minimal heating is required or where resistance heating is desired exclusively, the heating element may be sized to handle the complete heating load; a single port thermostat can be utilized and the changeover valve eliminated. In this arrangement, the bleed port of the thermostat could be connected directly to line 53 and chilled water could be circulated year-round through coil 13.

While we have described a preferred embodiment of the invention, it will be understood that the invention is not limited thereto since it may be otherwise embodied within the scope of the following claims.

We claim:
1. An air conditioning terminal comprising a casing having an inlet and an outlet therein,
 a plenum chamber in said casing adapted to be placed in communication with a source of primary air,
 discharge means operatively associated with said plenum chamber to discharge primary air within the casing to induce air from the area being conditioned through the inlet and to discharge a mixture of induced room air and primary air through the outlet,
 a heat exchanger disposed in said casing for passage of heat exchange medium therethrough,
 a damper disposed in said casing operable between an open position and a closed position for regulating the quantity of induced air passing through or bypassing said heat exchanger,
 control means responsive to the temperature of the air being conditioned to move said damper between the open position and the closed position,
 an electric resistance heating element disposed in said casing in the path of air flowing therethrough to increase the temperature of the air discharged from the casing, and
 means to energize said heating element when the damper is closed.

2. An air conditioning terminal according to claim 1 wherein said means to energize said heating element includes a switch affixed to said casing adapted for engagement by said damper when the damper is closed, said electric resistance heating element being disposed in said casing in the path of the mixed primary and induced air flowing therethrough.

3. An air conditioning terminal according to claim 2 wherein said control means for moving said damper includes a bellows adapted for communication with said plenum chamber for inflation thereof to move said damper toward a closed position, and, temperature responsive bleed means for reducing the air pressure in said bellows for deflation of said bellows to move said damper toward an open position.

4. An air conditioning terminal according to claim 3 wherein said temperature responsive bleed means includes a heating bleed port and a cooling bleed port,
 a changeover valve adapted for communication with said plenum chamber, said changeover valve being responsive to the temperature of the conditioning medium flowing through said heat exchanger to provide primary air to either the heating bleed port or the cooling bleed port of said temperature responsive bleed means, and
 switch means for deactivating said heating element when hot heat exchange medium is provided to the heat exchanger to prevent operation of said heating element irrespective of the position of said damper.

5. A method of operating an air conditioning terminal comprising the steps of:
 discharging primary air within the terminal to induce air from the area being conditioned to pass therethrough;
 supplying a cool heat exchange medium to a heat exchanger disposed in the terminal;
 regulating the quantity of induced air flowing across the heat exchanger by means of a damper arranged to divert induced air around the heat exchanger;
 passing substantially all of the induced air flowing through the terminal around the heat exchanger by closing the damper when heat is required in the area being conditioned; and
 supplying heat to the air flowing through the terminal in response to closure of the damper.

References Cited

UNITED STATES PATENTS

| | | | |
|---|---|---|---|
| 3,122,201 | 2/1964 | Ashley et al. | 165—123 X |
| 3,198,246 | 8/1965 | Brown et al. | 165—35 |
| 3,208,508 | 9/1965 | Bryans et al. | 165—22 X |
| 3,385,349 | 5/1968 | MacLeod | 165—29 X |
| 3,404,728 | 10/1968 | Laube | 165—27 X |

ROBERT A. O'LEARY, Primary Examiner

A. W. DAVIS, Assistant Examiner

U.S. Cl. X.R.

165—22, 26, 30, 59; 236—49